United States Patent
Lawrence et al.

(10) Patent No.: US 11,415,832 B2
(45) Date of Patent: Aug. 16, 2022

(54) DISPLAY SUPPLEMENTED WITH AMBIENT LIGHT

(71) Applicant: Intel Corporation, Santa Clara, CA (US)

(72) Inventors: Sean Jude William Lawrence, Bangalore (IN); Anil Joby, Kerala (IN); Raghavendra Angadimani, Bangalore KA (IN); Deepakumar Kv, Kollam KL (IN); Sriram Ranganathan, Bangalore KA (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/914,006

(22) Filed: Jun. 26, 2020

(65) Prior Publication Data

US 2020/0333664 A1 Oct. 22, 2020

(51) Int. Cl.
*G02F 1/13357* (2006.01)
*H05B 47/11* (2020.01)
*G02F 1/1335* (2006.01)

(52) U.S. Cl.
CPC ....... *G02F 1/133602* (2013.01); *H05B 47/11* (2020.01); *G02F 1/133612* (2021.01); *G09G 2320/0626* (2013.01)

(58) Field of Classification Search
CPC ......... G02F 1/133602; G02F 1/133612; G02F 1/133616; G02F 1/133618; G02F 1/133615; H05B 47/11; G09G 2320/0626; Y02B 20/40
See application file for complete search history.

(56) References Cited

U.S. PATENT DOCUMENTS

| | | | | |
|---|---|---|---|---|
| 2005/0051708 A1* | 3/2005 | Hotelling | .............. | G01J 1/4204 250/214 AL |
| 2008/0259067 A1* | 10/2008 | Wang | .................. | G09G 3/3406 345/207 |
| 2010/0309412 A1* | 12/2010 | Paul | .................. | G02F 1/133555 349/65 |
| 2015/0356905 A1* | 12/2015 | Watanabe | .............. | G09G 5/003 345/88 |
| 2019/0041566 A1* | 2/2019 | Piper | .................... | G04G 9/0005 |

(Continued)

FOREIGN PATENT DOCUMENTS

CN 107533228 A * 1/2018 ......... G02B 27/0172

OTHER PUBLICATIONS

"Microlens," Wikipedia; 1 page (last edited Jul. 4, 2020) https://en.wikipedia.org/wiki/Microlens.

(Continued)

*Primary Examiner* — Tracie Y Green
(74) *Attorney, Agent, or Firm* — Patent Capital Group

(57) ABSTRACT

Particular embodiments described herein provide for an electronic device that includes a display, a backlight for the display, and one or more ambient light guiding layers to supplement the backlight with ambient light. In an example, one of the one or more ambient light guiding layers is located on a back side of the electronic device. An ambient light guide monitoring engine can monitor an intensity of ambient light and a display engine can use data from the ambient light monitoring engine to determine the intensity of the backlight for the display.

20 Claims, 12 Drawing Sheets

(56) References Cited

U.S. PATENT DOCUMENTS

2020/0192422 A1* 6/2020 Hendren .......... G02F 1/133308

OTHER PUBLICATIONS

"Oled," Wikipedia; 35 pages (last edited Jul. 26, 2020) https://en.wikipedia.org/wiki/OLED.

He, Z., et al., "Liquid Crystal Beam Steering Devices: Principles, Recent Advances, and Future Developments," Crystals; pp. 1-24 (2019).

Hon., J., et al., "Mirror-like Display Creates Rich Color Pixels by Harnessing Ambient Light," The Optical Society; 1 page (Jun. 23, 2015) http://www.osa.org/en-us/about_osa/newsroom/news_releases/2015/mirrorlike_display_creates_rich_color_pixels_by_h/.

Li, J., "Refractive Indices of Liquid Crystals and Their Applications in Display and Photonic Devices," University of Florida Stars, Electronic Theses and Dissertations; 198 pages (2005).

Mantel, C., et al., "Controlling Power Consumption for Displays With Backlight Dimming," Journal of Display Technology; vol. 9, No. 12; pp. 933-940 (Dec. 2013).

* cited by examiner

DISPLAY SUPPLEMENTED WITH AMBIENT LIGHT

TECHNICAL FIELD

This disclosure relates in general to the field of computing, and more particularly, to a display supplemented with ambient light.

BACKGROUND

End users have more electronic device choices than ever before. A number of prominent technological trends are currently afoot and these trends are changing the electronic device landscape. Some of the technological trends involve a device that includes a display.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

Figure 1A:
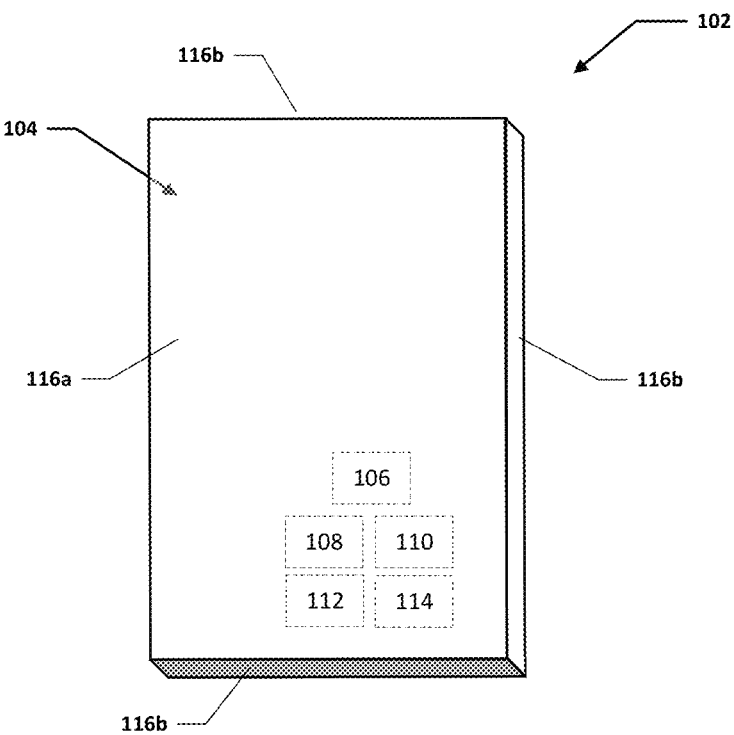
FIG. 1A is a simplified block diagram of a system to enable a display supplemented with ambient light, in accordance with an embodiment of the present disclosure.

The FIGURES of the drawings are not necessarily drawn to scale, as their dimensions can be varied considerably without departing from the scope of the present disclosure.

DETAILED DESCRIPTION

The following detailed description sets forth examples of apparatuses, methods, and systems relating to enabling a display supplemented with ambient light in accordance with an embodiment of the present disclosure. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

The terms "over," "under," "below," "between," and "on" as used herein refer to a relative position of one layer or component with respect to other layers or components. For example, one layer or component disposed over or under another layer or component may be directly in contact with the other layer or component or may have one or more intervening layers or components. Moreover, one layer or component disposed between two layers or components may be directly in contact with the two layers or components or may have one or more intervening layers or components. In contrast, a first layer or first component "directly on" a second layer or second component is in direct contact with that second layer or second component. Similarly, unless explicitly stated otherwise, one feature disposed between two features may be in direct contact with the adjacent features or may have one or more intervening layers.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example.

Figure 1B:
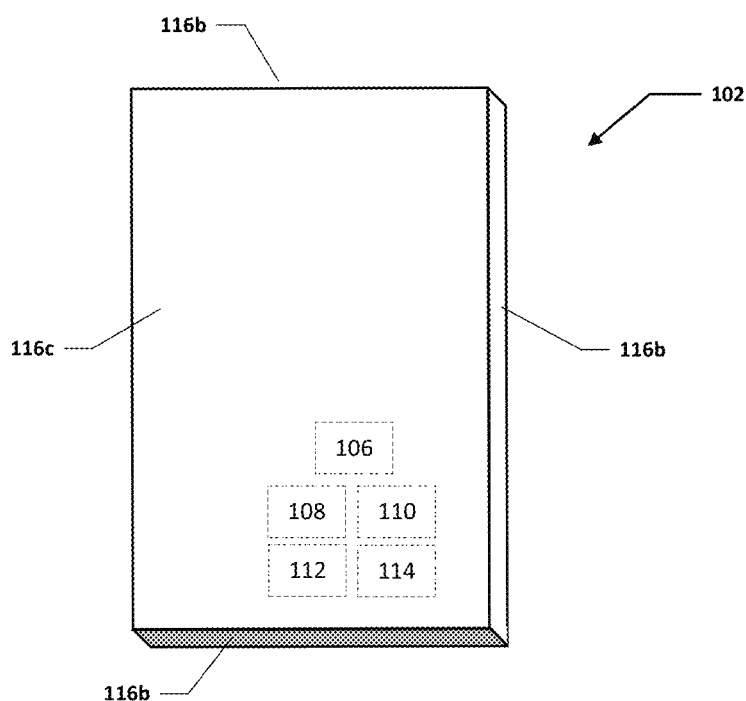
FIG. 1B is a simplified block diagram of a portion of system to enable a display supplemented with ambient light, in accordance with an embodiment of the present disclosure.

FIGS. 1A and 1B are a simplified block diagram of an electronic device configured to enable a display supplemented with ambient light, in accordance with an embodiment of the present disclosure. More specifically, FIG. 1A is a simplified block diagram of a front view of an electronic device configured to enable a display supplemented with ambient light, in accordance with an embodiment of the present disclosure and FIG. 1B is a simplified block diagram of a back view of an electronic device configured to enable a display supplemented with ambient light, in accordance with an embodiment of the present disclosure. In an example, an electronic device 102 can include a display 104, display engine 106, an ambient light monitoring engine 108, one or more processors 110, memory 112, and one or more components 114. Display engine 106 can be configured to help display an image on display 104. Ambient light monitoring engine 108 can be configured to monitor an intensity of ambient light. Each of one or more components 114 can be a device or group of devices available to assist in the operation or function of electronic device 102.

Electronic device 102 can also include one or more ambient light guiding layers. For example, as illustrated in FIG. 1A, electronic device 102 includes a front ambient light guiding layer 116a and one or more side ambient light guiding layers 116b. As illustrated in FIG. 1B, electronic device 102 include one or more side ambient light guiding layers 116b and a back ambient light guiding layer 116c. Front ambient light guiding layer 116a can be located in front of display 104. Side ambient light guiding layers 116b can be located on a side of electronic device 102 that is perpendicular to the side of electronic device 102 that includes front ambient light guiding layer 116a. Back ambient light guiding layer 116c is located on the back side of electronic device 102 and opposite to the side of electronic device 102 that includes front ambient light guiding layer 116a.

Ambient light guiding layers 116a-116c can be configured to guide ambient light to the edges of ambient light guiding layers 116a-116c. In a specific example, ambient light guiding layers 116a-116c can be configured to include lenses, light guides, reflectors, and/or some other means of bending ambient light to the edges of ambient light guiding layers 116a-116c. Ambient light monitoring engine 108 can be configured to monitor an intensity of the bent ambient light. The bent ambient light can be used to help supplement a backlight of display 104 and help display 104 to display an image to a user. As used herein, the terms "guided," "bent," "reflected," directed," and their derivatives all generally have the same meaning.

Front ambient light guiding layer 116a can be configured to not reflect the light from the image displayed on display 104 and allow light from the displayed image to pass through when display is active so the user can view the image displayed on display 104. When display 104 is not active, for example, during a vertical blanking interval, front ambient light guiding layer 116a can be configured to bend and/or reflect ambient light to the edges of front ambient light guiding layer 116a and the bent and/or reflected ambient light from front ambient light guiding layer 116a can be used to help supplement a backlight of display 104. More specifically, when an image is displayed on display 104, no ambient light will be guided by front ambient light guiding layer 116a due to the large difference in intensity from the light from the image on display 104 and the ambient light. When the backlight is off, there is not any light from display 104 and ambient light can be guided by front ambient light guiding layer 116a. In addition, when portions of display 104 are not illuminated, ambient light can be guided by front ambient light guiding layer 116a over the portions of display 104 that are not illuminated.

In some examples, ambient light monitoring engine 108 can be used to determine the amount of ambient light that can be combined and/or fused with the internal LED lighting used to display the image on display 104 and the intensity of the internal LED lighting can be adjusted accordingly. For example, if the amount of ambient light that can be combined and/or fused with the internal LED lighting is relatively low, then the intensity of internal LED lighting would need to be relatively high in intensity, in contrast if the amount of ambient light that can be combined and/or fused with the internal LED lighting is relatively high, then the internal LED lighting can be relatively low in intensity. In an example, display engine 106 can use data from ambient light monitoring engine 108 to help determine the intensity of the internal LED lighting that is used as backlighting. Power can be saved by supplementing the backlight used to display the image from display 104 with the bent incoming ambient light and allow the intensity of the system generated backlight to be reduced. The reduction the intensity of the system generated backlight can help conserve system power.

It is to be understood that other embodiments may be utilized and structural changes may be made without departing from the scope of the present disclosure. Substantial flexibility is provided by an electronic device in that any suitable arrangements and configuration may be provided without departing from the teachings of the present disclosure.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment.

For purposes of illustrating certain example techniques of electronic device 102, the following foundational information may be viewed as a basis from which the present disclosure may be properly explained. Generally, a display (e.g., computer display, computer monitor, monitor, etc.) is an output device that displays information in pictorial form. One common type of display is a liquid crystal display (LCD). There are multiple technologies that have been used to implement LCDs.

LCDs are used in a wide range of applications, including LCD televisions, computer monitors, instrument panels, aircraft cockpit displays, and indoor and outdoor signage. Small LCD screens are common in portable consumer devices such as digital cameras, watches, calculators, and mobile telephones, including smartphones. LCD screens are also used on consumer electronics products such as DVD players, video game devices and clocks. LCD screens have replaced heavy, bulky cathode ray tube (CRT) displays in nearly all applications. LCD screens are available in a wider range of screen sizes than CRT and plasma displays, with LCD screens available in sizes ranging from tiny digital watches to very large television receivers.

Each pixel of an LCD typically consists of a layer of molecules aligned between two transparent electrodes and two polarizing filters (parallel and perpendicular), the axes of transmission of which are (in most of the cases) perpendicular to each other. Without the liquid crystal between the polarizing filters, light passing through the first filter would be blocked by the second (crossed) polarizer. Before an electric field is applied, the orientation of the liquid-crystal molecules is determined by the alignment at the surfaces of electrodes. In a twisted nematic (TN) device, the surface alignment directions at the two electrodes are perpendicular to each other, and so the molecules arrange themselves in a helical structure, or twist. This induces the rotation of the polarization of the incident light, and the device appears gray. If the applied voltage is large enough, the liquid crystal molecules in the center of the layer are almost completely untwisted and the polarization of the incident light is not rotated as it passes through the liquid crystal layer. This light will then be mainly polarized perpendicular to the second filter, and thus be blocked and the pixel will appear black. By controlling the voltage applied across the liquid crystal layer in each pixel, light can be allowed to pass through in varying amounts, thus constituting different levels of gray. Color LCD systems use the same technique but color filters are typically used to generate red, green, and blue pixels. The color filters are made with a photolithography process where red, green, blue, and black resists are used. Resists contain a finely ground powdered pigment with particles being nanometers across (e.g., 40 nanometers) The black resist is the first to be applied and will create a black grid that will separate red, green, and blue subpixels from one another. After the black resist has been dried in an oven and exposed to UV light through a photomask, the unexposed areas are washed away. Then the same process is repeated with the remaining red, green, and blue resists. This fills the holes in the black grid (or matrix) with their corresponding colored resist LCDs are available to display arbitrary images (as in a general-purpose computer display) or fixed images with low information content that can be displayed or hidden, such as preset words, digits, and seven-segment displays as in a digital clock. LCDs that display arbitrary images use the same basic technology, except that arbitrary images are made from a matrix of small pixels, while other displays have larger elements. LCDs can either be normally on (positive) or off (negative), depending on the polarizer arrangement. For example, a character positive LCD with a backlight will have black lettering on a background that is the color of the backlight and a character negative LCD will have a black background with the letters being of the same color as the backlight. In white on blue LCDs, optical filters are added to give them their characteristic appearance.

Typically, an LCD is a flat-panel display or other electronically modulated optical device that uses the light-modulating properties of liquid crystals combined with polarizers. Liquid crystals do not emit light directly and instead a backlight or reflector is used to produce images in color or monochrome. Since LCDs produce no light of their own, they require external light to produce a visible image. In a transmissive type of LCD, the light source is provided at the back of a glass stack and is called a backlight. There are several methods of backlighting an LCD panel using LEDs, including the use of either white or red, green, and blue (RGB) LED arrays behind the panel and edge-LED backlighting (e.g., white LEDs around the inside frame of a television and a light-diffusion panel to spread the light evenly behind the LCD panel). A LED-backlit LCD is a display that uses LED backlighting instead of traditional cold cathode fluorescent (CCFL) backlighting.

Some LCD panels are lit either by two cold cathode fluorescent lamps placed at opposite edges of the display or an array of parallel CCFLs behind larger displays. A diffuser then spreads the light out evenly across the whole display. For many years, this technology had been used almost exclusively. Unlike white LEDs, most CCFLs have an even-white spectral output resulting in a better color gamut for the display. However, CCFLs are less energy efficient than LEDs and require a somewhat costly inverter to convert whatever DC voltage the device uses (usually 5 or 12 V) to approximately one thousand (1000) volts needed to light a CCFL. The thickness of the inverter transformers also limits how thin the display can be made. Currently, most LCD screens are designed with an LED backlight instead of the traditional CCFL backlight and the backlight is dynamically controlled with the video information (dynamic backlight control). The combination of reflective polarizers and prismatic films with the dynamic backlight control can help to increase the dynamic range of the display system. Some LCD backlight systems are made more efficient by applying optical films such as prismatic structure to gain the light into the desired viewer directions and by using reflective polarizing films that recycle the polarized light that was formerly absorbed by the first polarizer of the LCD. These polarizers consist of a large stack of uniaxial oriented birefringent films that reflect the former absorbed polarization mode of the light. Such reflective polarizers typically use uniaxial oriented polymerized liquid crystals (birefringent polymers or birefringent glue).

Emerging trends in systems place increasing performance demands on the system. With the ever-increasing performance demands, power consumption can become a relatively large issue for some systems. One area where power is used is in the backlight of some displays. What is needed is system and method that can help to reduce the power consumption of the backlight for a display.

A system and method to help to reduce the power consumption of the backlight for a display can resolve these issues (and others). In an example, an electronic device (e.g., electronic device 102) can include an ambient powered display system to use ambient light as one of the lighting sources to help with LED backlighting. This can result in a minimal usage of power for the LCD backlight, especially when electronic devices are used in a daylight environment or where there is a relatively large amount of ambient light.

More specifically, the front, sides, and/or back of the housing of an electronic device can include an ambient light guiding layer. The ambient light guiding layer can include light controllers and/or benders that guide ambient light to the edges of the ambient light guiding layer. The ambient light can supplement the backlight of the display and allow the intensity of the system generated backlight to be reduced. The reduction the intensity of the system generated backlight can help conserve system power and allow the power that would have been used by the system generated backlight to be used elsewhere in the system. In some examples, due to the large difference in intensity from the light from the image on the display and the ambient light, the ambient light guiding layer on the front of the display can guide ambient light to the edges of the front ambient light guiding layer when the display is not active and does not or cannot guide the ambient light to the edges of the front ambient light guiding layer when the display is active.

In a specific illustrative example, the front ambient light guiding layer over the display can guide the ambient light to the edges of the front ambient light guiding layer during vertical blanking intervals when the display is inactive. Within a frame, there are active lines and vertical blanking lines. The amount of active lines determines the active frame time and the vertical blanking lines determines the vertical blanking interval. The active frame lines are the scan lines of a video signal that contain picture information. Most, if not all of the active frame lines are visible on a display. The vertical blanking interval, also known as the vertical interval, or VBLANK, is the time between the end of the final visible line of a frame (e.g., the active frame lines) and the beginning of the first visible line of the next frame. The vertical blanking interval is present in analog television, VGA, DVI, and other signals.

The vertical blanking interval was originally needed because in a cathode ray tube monitor, the inductive inertia of the magnetic coils which deflect the electron beam vertically to the position being drawn could not change instantly and time needed to be allocated to account for the time necessary for the position change. Additionally, the speed of older circuits was limited. For horizontal deflection, there is also a pause between successive lines, to allow the beam to return from right to left, called the horizontal blanking interval. Modern CRT circuitry does not require such a long blanking interval, and thin panel displays require none, but the standards were established when the delay was needed and to allow the continued use of older equipment. In analog television systems the vertical blanking interval can be used for datacasting to carry digital data (e.g., various test signals, time codes, closed captioning, teletext, CGMS-A copy-protection indicators, various data encoded by the XDS protocol (e.g., content ratings for V-chip use), etc.), during this time period.

In an example implementation, electronic device 102, is meant to encompass an electronic device that includes an LCD and/or a backlight, especially a computer, laptop, electronic notebook, hand held device, wearables, network elements that have an LCD, or any other device, component, element, or object that has an LCD and/or a backlight. Electronic device 102 may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Electronic device 102 may include virtual elements.

In regards to the internal structure, electronic device 102 can include memory elements for storing information to be used in operations. Electronic device 102 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received could be provided in any database, register, queue, table, cache, control list, or other storage structure, all of which can be referenced at any suitable timeframe. Any such storage options may also be included within the broad term 'memory element' as used herein.

In certain example implementations, functions may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations. This includes the memory elements being able to store software, logic, code, or processor instructions that are executed to carry out activities.

In an example implementation, electronic device 102 may include software modules (e.g., display engine 106, ambient light monitoring engine 108, ambient light controller 128, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, electronic device 102 may include a processor that can execute software or an algorithm to perform activities as discussed herein. A processor can execute any type of instructions associated with the data in the memory to achieve operations. In one example, the processors could transform an element or an article (e.g., data) from one state or thing to another state or thing. In another example, activities may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Implementations of the embodiments disclosed herein may be formed or carried out on a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

Figure 2A:
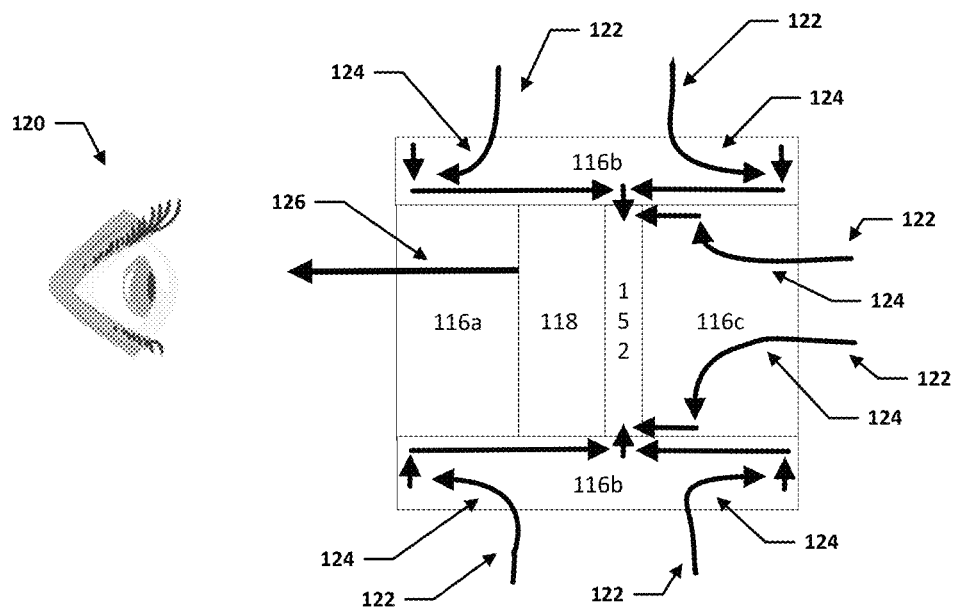
FIG. 2A is a simplified block diagram of a portion of a system to enable a display supplemented with ambient light, in accordance with an embodiment of the present disclosure.

Turning to FIG. 2A, FIG. 2A is a simple block diagram illustrating incoming ambient light 122 entering side ambient light guiding layers 116b and 116c and becoming bent ambient light 124. Front ambient light guiding layer 116a allows display image light 126 from a display image layer 118 to pass through front ambient light guiding layer 116a and be observable by a user 120. Display image layer 118 can be the display layer where display engine 106 can help to display an image to a user. Display image layer 118 can include a backlight 152. Bent ambient light 124 can be focused to be used by backlight 152.

Figure 2B:
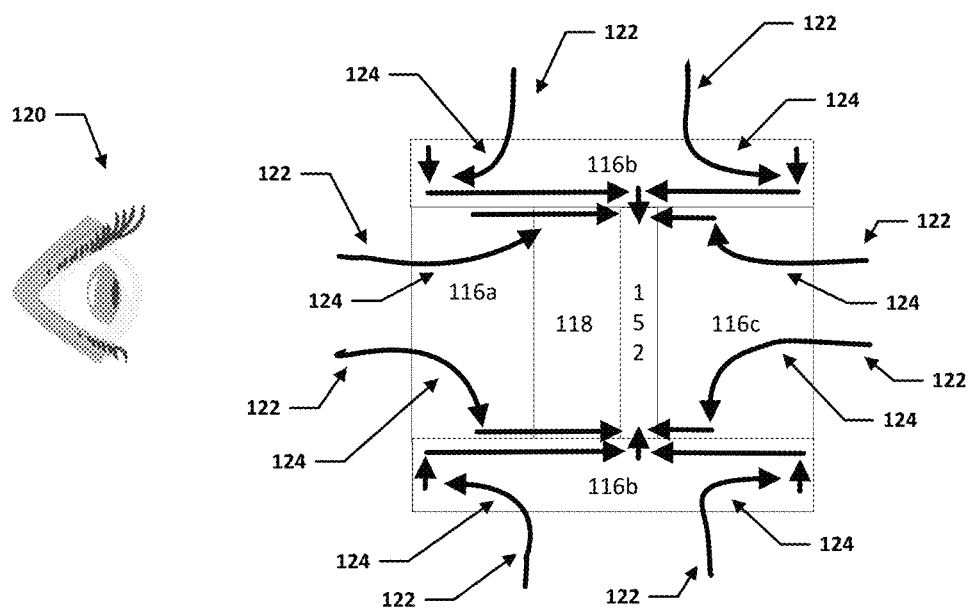
FIG. 2B is a simplified block diagram of a portion of a system to enable a display supplemented with ambient light, in accordance with an embodiment of the present disclosure.

Turning to FIG. 2B, FIG. 2B is a simple block diagram illustrating incoming ambient light 122 entering ambient light guiding layers 116a-116c and becoming bent ambient light 124. When display is not active, for example, during a vertical blanking interval, ambient light 122 enters front ambient light guiding layer 116a and becomes bent ambient light 124. Bent ambient light 124 can be focused to be used by backlight 152. More specifically, when an image is displayed on display 104, no ambient light will be guided by front ambient light guiding layer 116a due to the large difference in intensity from the light from the image on display 104 and the ambient light. When there is not any light from display 104, or a portion of display 104, ambient light 122 can be guided by front ambient light guiding layer 116a.

Figure 3:
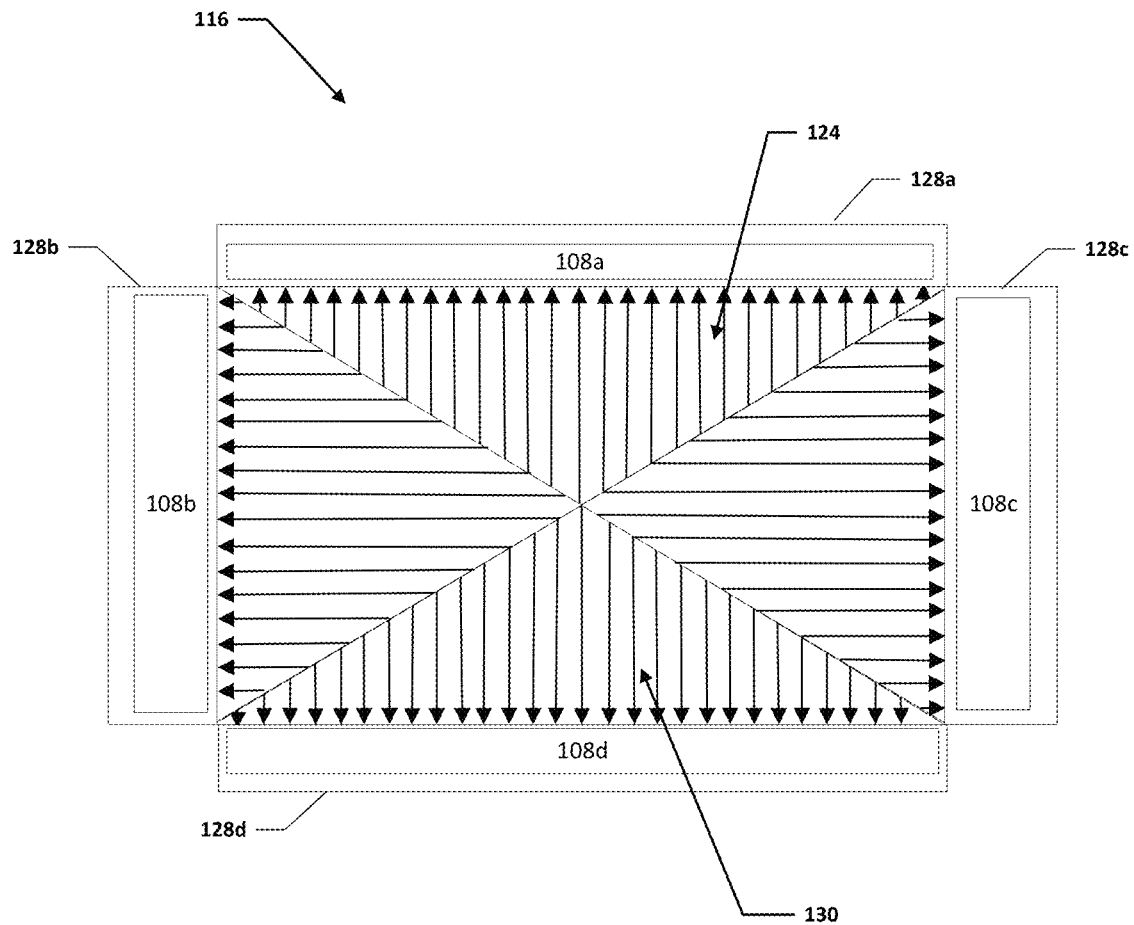
FIG. 3 is a simplified block diagram of a portion of a system to enable a display supplemented with ambient light, in accordance with an embodiment of the present disclosure.

Turning to FIG. 3, FIG. 3 is a simple block diagram illustrating bent ambient light 124 in ambient light guiding layer 116 (e.g., ambient light guiding layer 116a when there is not light from display 104 or a portion of display 104 and side ambient light guiding layers 116b and 116c) being guided to the edges of ambient light guiding layer 116. In an example, ambient light guiding layer 116 can include one or more ambient light controllers, one or more ambient light monitoring engines, and ambient light directive material. For example, as illustrated in FIG. 3, ambient light guiding layer 116 includes ambient light controllers 128a-128d, ambient light monitoring engines 108a-108d, and ambient light directive material 130. Each ambient light monitoring engine 108a-108d can be configured monitor and/or measure the amount and/or intensity of bent ambient light 124 and communicate the amount and/or intensity of bent ambient light 124 to display engine 106 (not shown). Each ambient light controller 128a-128d can reflect bent ambient light 124 to display image layer 118 (not shown) so the reflected bent ambient light 124 can be used to supplement the blacklight. Ambient light directive material 130 can guide ambient light that contacts ambient light guiding layer 116 and direct the bent ambient light to the edges of ambient light guiding layer 116. Ambient light directive material 130 can include lenses, light guides, reflectors, or some other means of guiding, bending, reflecting, etc. ambient light to the edges of ambient light guiding layer 116.

More specifically, lenses, light guides, reflectors, in ambient light guiding layer 116 can be orientated and/or configured such that as ambient light enters ambient light guiding layer 116, the ambient light is guided, bent, reflected, etc. to the sides of ambient light guiding layer 116. As illustrated in FIG. 3, a top side of ambient light guiding layer 116 can include ambient light controller 128a. Ambient light controller 128a can include ambient light monitoring engine 108a. A first side of ambient light guiding layer 116 can include ambient light controller 128b. Ambient light controller 128b can include ambient light monitoring engine 108b. A second side of ambient light guiding layer 116 can include ambient light controller 128c. Ambient light controller 128c can include ambient light monitoring engine 108c. A bottom side of ambient light guiding layer 116 can include ambient light controller 128d. Ambient light controller 128d can include ambient light monitoring engine 108d. It should be noted that while four ambient light monitoring engines are illustrated, more ambient light monitoring engines may be used for a more precise monitored and/or measured amount and/or intensity of bent ambient light 124. In addition, fewer than four ambient light monitoring engines may be used but if fewer than four ambient light monitoring engines, an accurate reading of the ambient light that can be used to supplement the backlight may be difficult but can be extrapolated.

Figure 4:
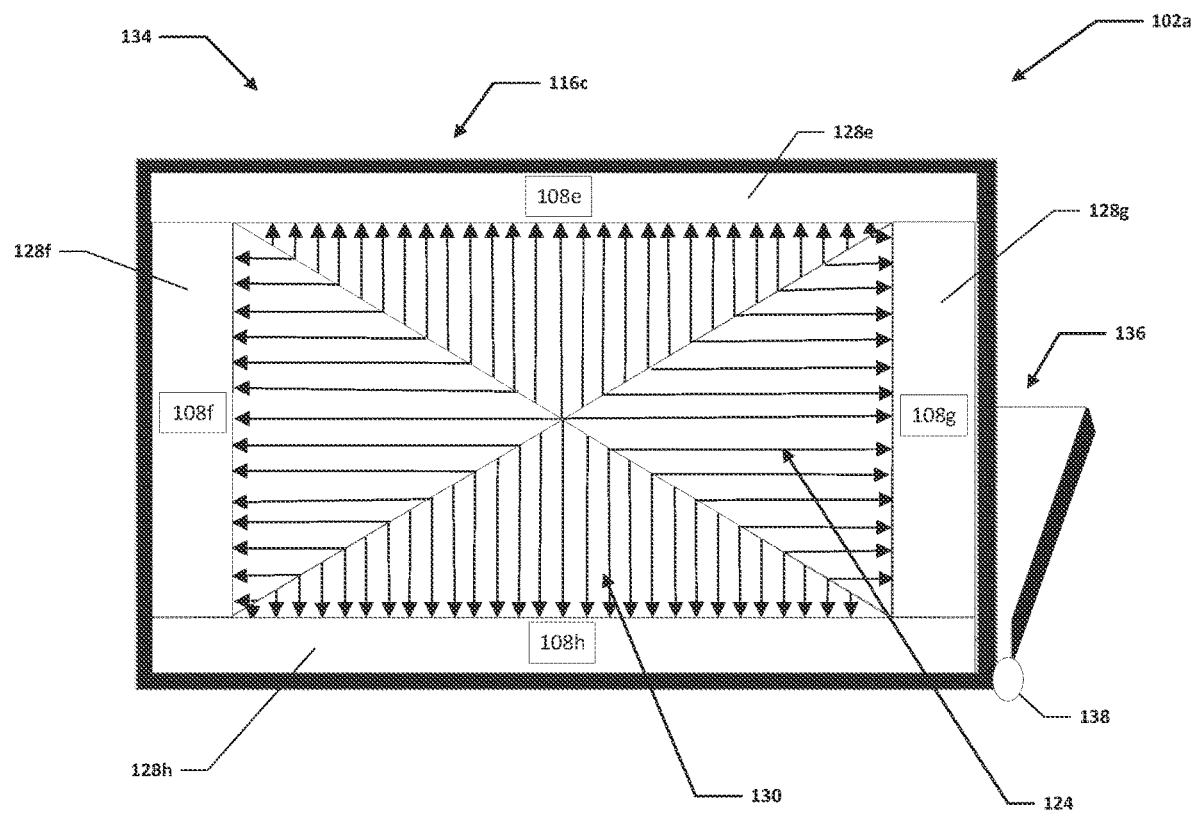
FIG. 4 is a simplified block diagram of a portion of a system to enable a display supplemented with ambient light, in accordance with an embodiment of the present disclosure.

Turning to FIG. 4, FIG. 4 is a simplified block diagram of a back view of an electronic device 102a configured to enable a display supplemented with ambient light, in accordance with an embodiment of the present disclosure. Electronic device 102a can include a first housing 134 and a second housing 136. First housing 134 can be rotatably coupled to second housing 136 using a hinge 138. In an example, electronic device 102a is a laptop computer and first housing 134 can include a display (not shown) and second housing 136 can include a keyboard (not shown).

As illustrated in FIG. 4, a back side of first housing 134, or the side opposite the display, can include ambient light guiding layer 116c. Ambient light guiding layer 116c can include one or more ambient light monitoring engines 108e-108h, one or more ambient light controllers 128e-128h, and ambient light directive material 130. As illustrated in FIG. 4, a top side of ambient light guiding layer 116c can include ambient light controller 128e. Ambient light controller 128e can include ambient light monitoring engine 108e. A first side of ambient light guiding layer 116c can include ambient light controller 128f. Ambient light controller 128f can include ambient light monitoring engine 108f. A second side of ambient light guiding layer 116c can include ambient light controller 128g. Ambient light controller 128g can include ambient light monitoring engine 108g. A bottom side of ambient light guiding layer 116c can include ambient light controller 128h. Ambient light controller 128h can include ambient light monitoring engine 108h. It should be noted that while four ambient light monitoring engines are illustrated, more ambient light monitoring engines may be used for a more precise monitored and/or measured amount and/or intensity of bent ambient light 124. Ambient light directive material 130 can guide ambient light that contacts ambient light guiding layer 116c and direct the bent ambient light to the edges of ambient light guiding layer 116c. Each of ambient light controllers 128e-128h can reflect bent ambient light 124 to display image layer 118 so the reflected bent ambient light can be used to supplement the blacklight for an image displayed on display image layer 118.

Figure 5A:
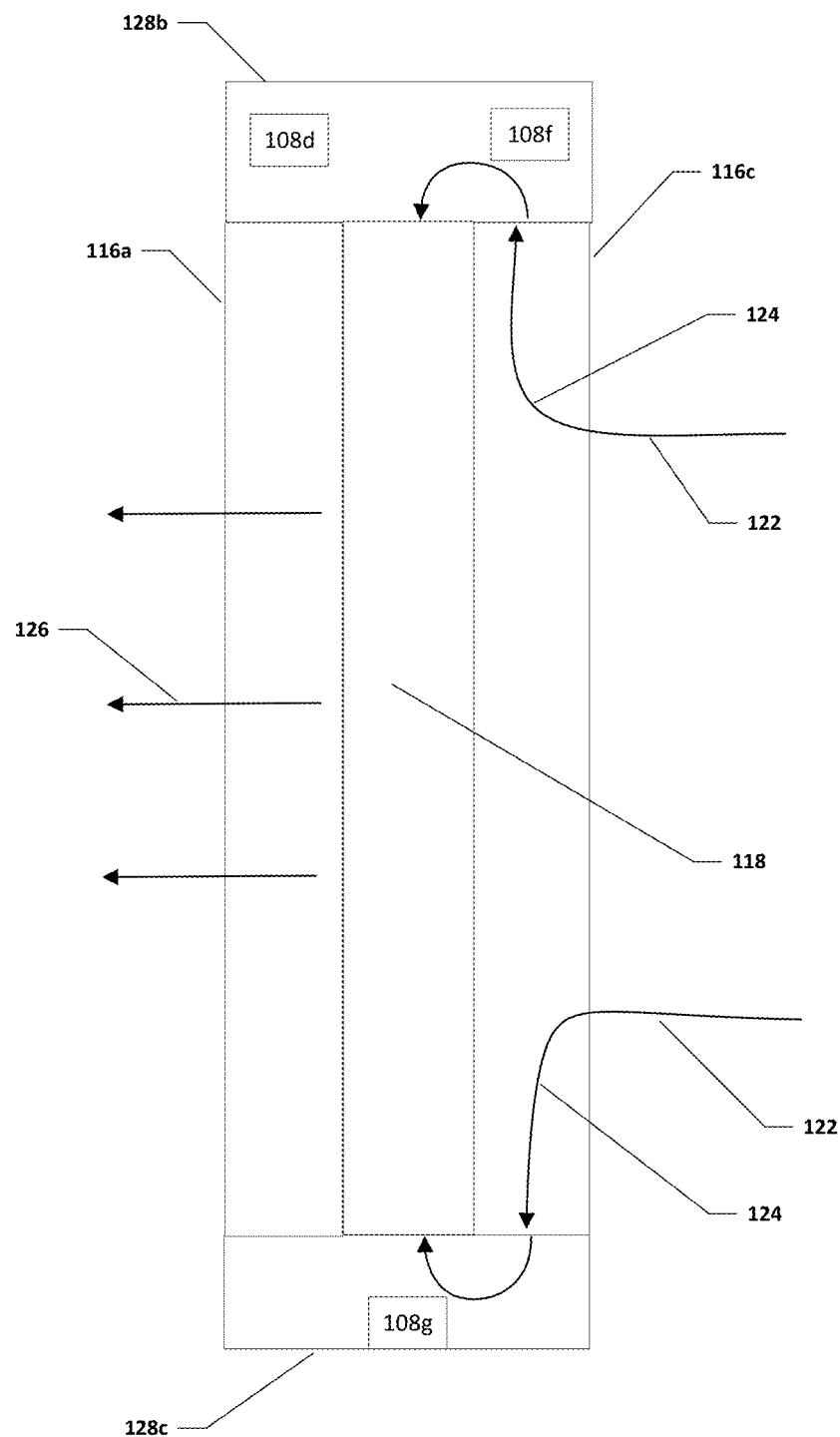
FIG. 5A is a simplified block diagram of a portion of a system to enable a display supplemented with ambient light, in accordance with an embodiment of the present disclosure.

Turning to FIG. 5A, FIG. 5A is a simple block diagram illustrating display image light 126 passing through front ambient light guiding layer 116a and ambient light 122 entering back ambient light guiding layer 116c and becoming bent ambient light 124. Bent ambient light 124 in back ambient light guiding layer 116c can be guided to the edges of back ambient light guiding layer 116c and to ambient light controllers. Front ambient light guiding layer 116*a* and back ambient light guiding layer 116*c* can have or share the same ambient light controllers. For example, as illustrated in FIG. 5A, as ambient light 122 enters back ambient light guiding layer 116*c*, it becomes bent ambient light 124 and is guided towards ambient light controller 128*b* on the first side of front ambient light guiding layer 116*a* and back ambient light guiding layer 116*c* or towards ambient light controller 128*c* on the second side of front ambient light guiding layer 116*a* and back ambient light guiding layer 116*c*. Ambient light controllers 128*b* and 128*c* can reflect bent ambient light 124 to display image layer 118 so the reflected bent ambient light 124 can be used to supplement a blacklight in display image layer 118.

One or more ambient light monitoring engines 108 can be configured monitor and/or measure the amount and/or intensity of bent ambient light 124 and communicate the amount and/or intensity of bent ambient light 124 to display engine 106 (not shown). For example, as illustrated in FIG. 5A, ambient light monitoring engines 108*f* and 108*g* can help monitor and/or measure the amount and/or intensity of bent ambient light 124 associated with at least a portion of back ambient light guiding layer 116*c*. Note that as illustrated in FIG. 5A, a separate ambient light monitoring engine 108 may be associated with each ambient light guiding layer 116 (e.g., ambient light monitoring engine 108*d* is associated with front ambient light guiding layer 116*a* and ambient light monitoring engine 108*f* is associated with back ambient light guiding layer 116*c*) or each ambient light guiding layer 116 can share one ambient light monitoring engine 108 (e.g., front ambient light guiding layer 116*a* and back ambient light guiding layer 116*c* share ambient light monitoring engine 108*g*). The number and location of one or more ambient light monitoring engines 108 is dependent on design choices and design constraints.

Figure 5B:
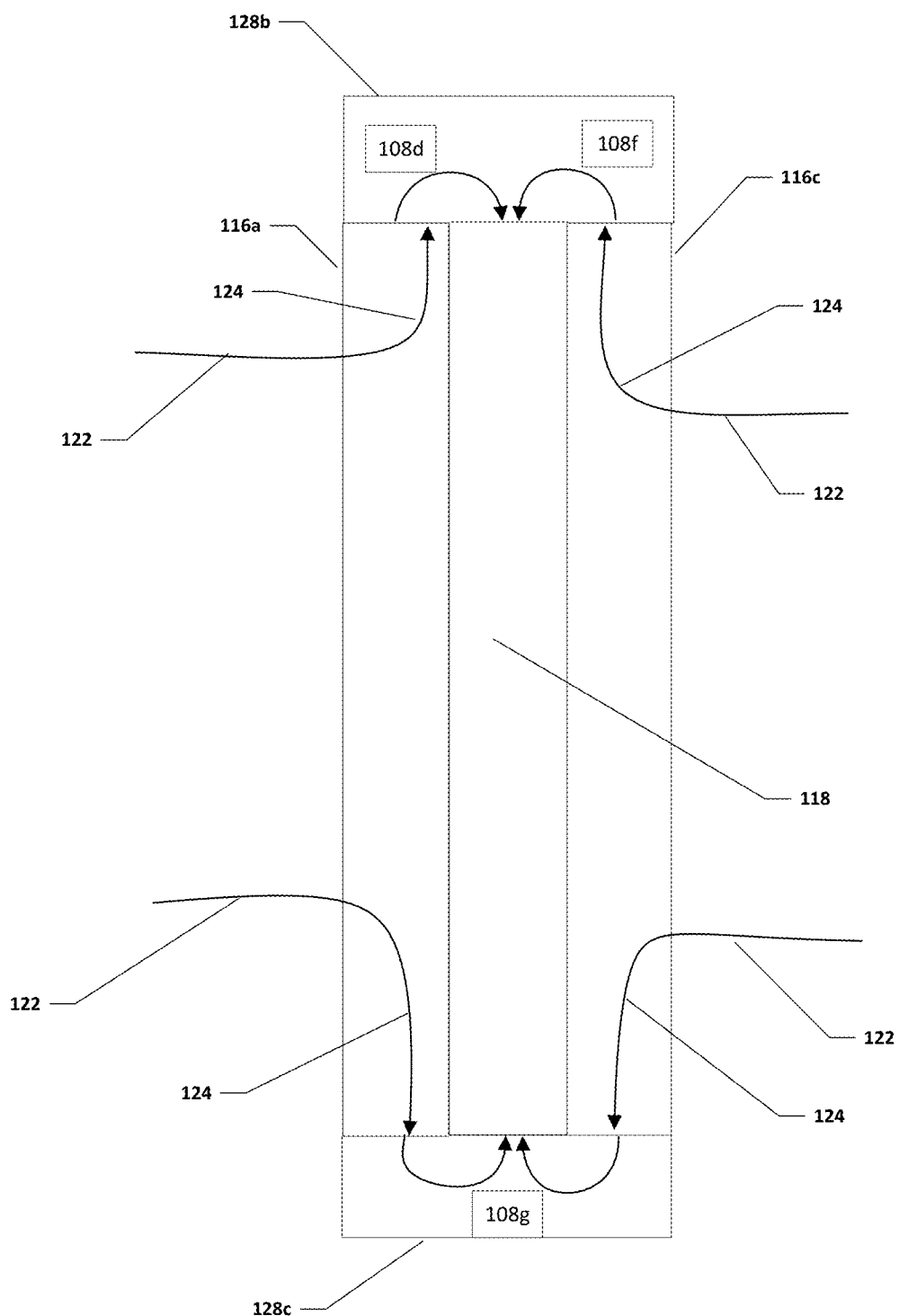
FIG. 5B is a simplified block diagram of a portion of a system to enable a display supplemented with ambient light, in accordance with an embodiment of the present disclosure.

Turning to FIG. 5B, FIG. 5B is a simple block diagram illustrating ambient 122 light entering front ambient light guiding layer 116*a* and becoming bent ambient light 124 and ambient light 122 entering back ambient light guiding layer 116*c* and becoming bent ambient light 124. When display image light 126 is not passing through front ambient light guiding layer 116*a* (e.g., during a vertical blanking interval) bent ambient light 124 in front ambient light guiding layer 116*a* can be guided to the edges of front ambient light guiding layer 116*a* and to ambient light controllers. Bent ambient light 124 in back ambient light guiding layer 116*c* can be guided to the edges of back ambient light guiding layer 116*c* and to ambient light controllers. Front ambient light guiding layer 116*a* and back ambient light guiding layer 116*c* can have or share the same ambient light controllers. For example, as illustrated in FIG. 5B, as ambient light 122 enters front ambient light guiding layer 116*a* and back ambient light guiding layer 116*c*, it becomes bent ambient light 124 and is guided towards ambient light controller 128*b* on the first side of front ambient light guiding layer 116*a* and back ambient light guiding layer 116*c* or towards ambient light controller 128*c* on the second side of front ambient light guiding layer 116*a* and back ambient light guiding layer 116*c*. Ambient light controllers 128*b* and 128*c* can reflect bent ambient light 124 to display image layer 118 so the reflected bent ambient light 124 can be used to supplement a blacklight in display image layer 118.

One or more ambient light monitoring engines 108 can be configured to monitor and/or measure the amount and/or intensity of bent ambient light 124 and communicate the amount and/or intensity of bent ambient light 124 to display engine 106 (not shown). For example, as illustrated in FIG. 5B, ambient light monitoring engines 108*f* and 108*g* can help monitor and/or measure the amount and/or intensity of bent ambient light 124 associated with at least a portion of front ambient light guiding layer 116*a* and back ambient light guiding layer 116*c*. Note that as illustrated in FIG. 5B, a separate ambient light monitoring engine 108 may be associated with each ambient light guiding layer 116 (e.g., ambient light monitoring engine 108*d* is associated with front ambient light guiding layer 116*a* and ambient light monitoring engine 108*f* is associated with back ambient light guiding layer 116*c*) or each ambient light guiding layer 116 can share one ambient light monitoring engine 108 (e.g., front ambient light guiding layer 116*a* and back ambient light guiding layer 116*c* share ambient light monitoring engine 108*g*). The number and location of one or more ambient light monitoring engines 108 is dependent on design choices and design constraints.

Figure 6A:
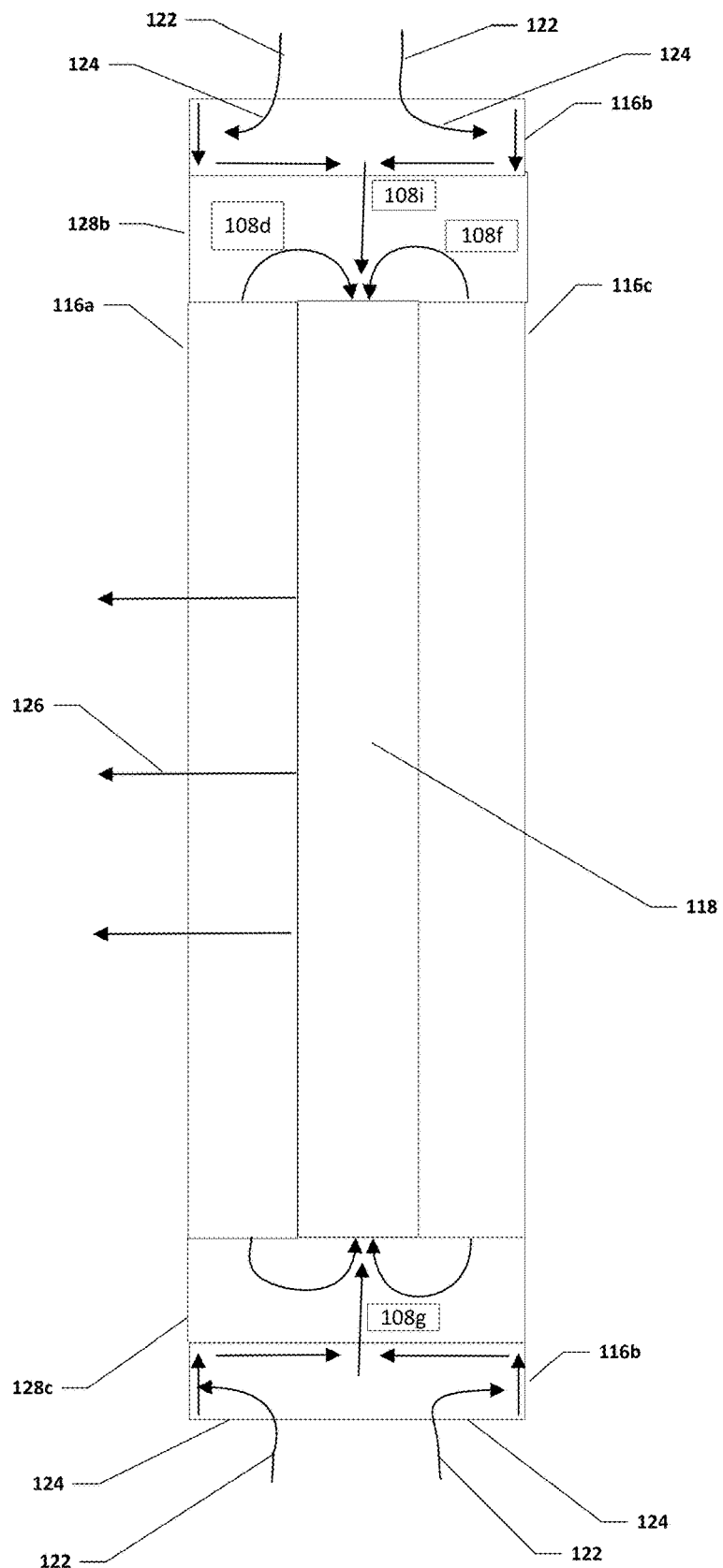
FIG. 6A is a simplified block diagram of a portion of a system to enable a display supplemented with ambient light, in accordance with an embodiment of the present disclosure.

Turning to FIG. 6A, FIG. 6A is a simple block diagram illustrating display image light 126 passing through front ambient light guiding layer 116*a* and ambient light 122 entering side ambient light guiding layers 116*b* and back ambient light guiding layer 116*c* and becoming bent ambient light 124. Bent ambient light 124 in side ambient light guiding layers 116*b* can be directed to the edges of side ambient light guiding layers 116*b* and to ambient light controllers. Bent ambient light 124 in back ambient light guiding layer 116*c* can be directed to the edges of back ambient light guiding layer 116*c* and to ambient light controllers. Front ambient light guiding layer 116*a*, side ambient light guiding layers 116*b*, and back ambient light guiding layer 116*c* can have or share the same ambient light controllers. For example, as illustrated in FIG. 6A, as ambient light 122 enters side ambient light guiding layer 116*b* and back ambient light guiding layer 116*c*, it becomes bent ambient light 124 and is guided towards ambient light controller 128*b* on the first side of front ambient light guiding layer 116*a* and back ambient light guiding layer 116*c* or towards ambient light controller 128*c* on the second side of front ambient light guiding layer 116*a* and back ambient light guiding layer 116*c*. Ambient light controllers 128*b* and 128*c* can reflect bent ambient light 124 to display image layer 118 so the reflected bent ambient light 124 can be used to supplement a blacklight in display image layer 118.

One or more ambient light monitoring engines 108 can be configured monitor and/or measure the amount and/or intensity of bent ambient light 124 and communicate the amount and/or intensity of bent ambient light 124 to display engine 106 (not shown). For example, as illustrated in FIG. 6A, ambient light monitoring engines 108*f* and 108*g* can help monitor and/or measure the amount and/or intensity of bent ambient light 124 associated with at least a portion of side ambient light guiding layers 116*b* and back ambient light guiding layer 116*c*. Note that as illustrated in FIG. 6A, a separate ambient light monitoring engine 108 may be associated with each ambient light guiding layer 116 (e.g., ambient light monitoring engine 108*d* is associated with front ambient light guiding layer 116*a*, ambient light monitoring engine 108*i* is associated with side ambient light guiding layer 116*b*, and ambient light monitoring engine 108*f* is associated with back ambient light guiding layer 116*c*) or each ambient light guiding layer 116 can share one ambient light monitoring engine 108 (e.g., front ambient light guiding layer 116*a*, side ambient light guiding layer 116*b*, and back ambient light guiding layer 116*c* share ambient light monitoring engine 108*g*). The number and location of one or more ambient light monitoring engines 108 is dependent on design choices and design constraints.

Figure 6B:
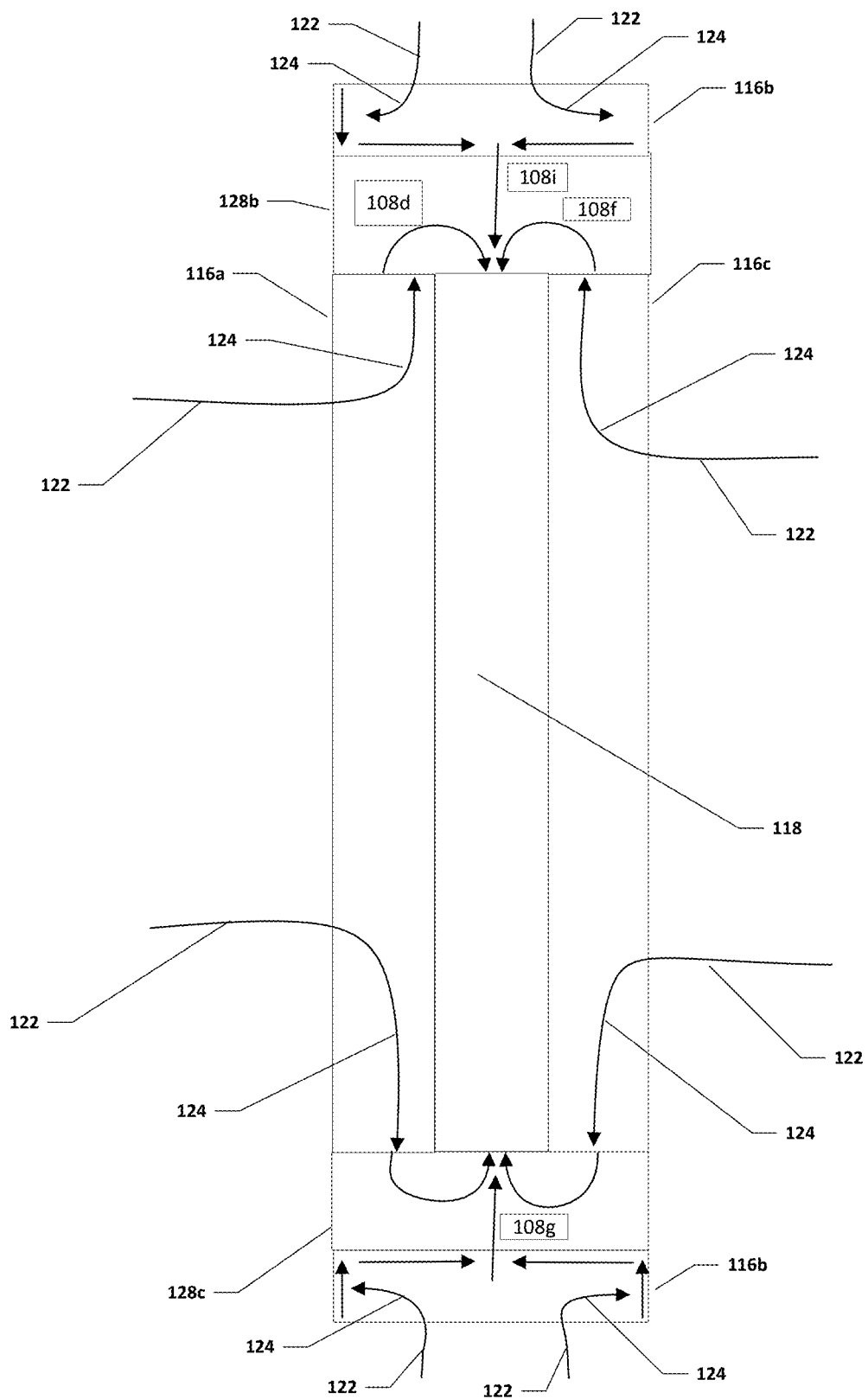
FIG. 6B is a simplified block diagram of a portion of a system to enable a display supplemented with ambient light, in accordance with an embodiment of the present disclosure.

Turning to FIG. 6B, FIG. 6B is a simple block diagram illustrating ambient light 122 entering front ambient light guiding layer 116a and becoming bent ambient light 124, ambient light 122 entering side ambient light guiding layer 116b and becoming bent ambient light 124, and ambient light 122 entering back ambient light guiding layer 116c and becoming bent ambient light 124. When display image light 126 is not passing through front ambient light guiding layer 116a (e.g., during a vertical blanking interval) bent ambient light 124 in front ambient light guiding layer 116a can be directed to the edges of front ambient light guiding layer 116a and to ambient light controllers. Bent ambient light 124 in side ambient light guiding layer 116b and back ambient light guiding layer 116c can be directed to the edges of back ambient light guiding layer 116c and to ambient light controllers. Front ambient light guiding layer 116a, side ambient light guiding layer 116b, and back ambient light guiding layer 116c can have or share the same ambient light controllers. For example, as illustrated in FIG. 6B, as ambient light 122 enters front ambient light guiding layer 116a, side ambient light guiding layer 116b, and back ambient light guiding layer 116c, it becomes bent ambient light 124 and is guided towards ambient light controller 128b on the first side of front ambient light guiding layer 116a and back ambient light guiding layer 116c or towards ambient light controller 128c on the second side of front ambient light guiding layer 116a and back ambient light guiding layer 116c. Ambient light controllers 128b and 128c can reflect bent ambient light 124 to display image layer 118 so the reflected bent ambient light 124 can be used to supplement a blacklight in display image layer 118.

One or more ambient light monitoring engines 108 can be configured monitor and/or measure the amount and/or intensity of bent ambient light 124 and communicate the amount and/or intensity of bent ambient light 124 to display engine 106 (not shown). For example, as illustrated in FIG. 6B, ambient light monitoring engine 108d can help monitor and/or measure the amount and/or intensity of bent ambient light 124 associated with at least a portion of front ambient light guiding layer 116a, ambient light monitoring engine 108i can help monitor and/or measure the amount and/or intensity of bent ambient light 124 associated with at least a portion of side ambient light guiding layer 116b and ambient light monitoring engine 108f can help monitor and/or measure the amount and/or intensity of bent ambient light 124 associated with at least a portion back ambient light guiding layer 116c. Note that as illustrated in FIG. 6B, a separate ambient light monitoring engine 108 may be associated with each ambient light guiding layer 116 (e.g., ambient light monitoring engine 108d is associated with front ambient light guiding layer 116a, ambient light monitoring engine 108i is associated with side ambient light guiding layer 116b, and ambient light monitoring engine 108f is associated with back ambient light guiding layer 116c) or each ambient light guiding layer 116 can share one ambient light monitoring engine 108 (e.g., front ambient light guiding layer 116a, side ambient light guiding layer 116b, and back ambient light guiding layer 116c share ambient light monitoring engine 108g). The number and location of one or more ambient light monitoring engines 108 is dependent on design choices and design constraints.

Figure 7:
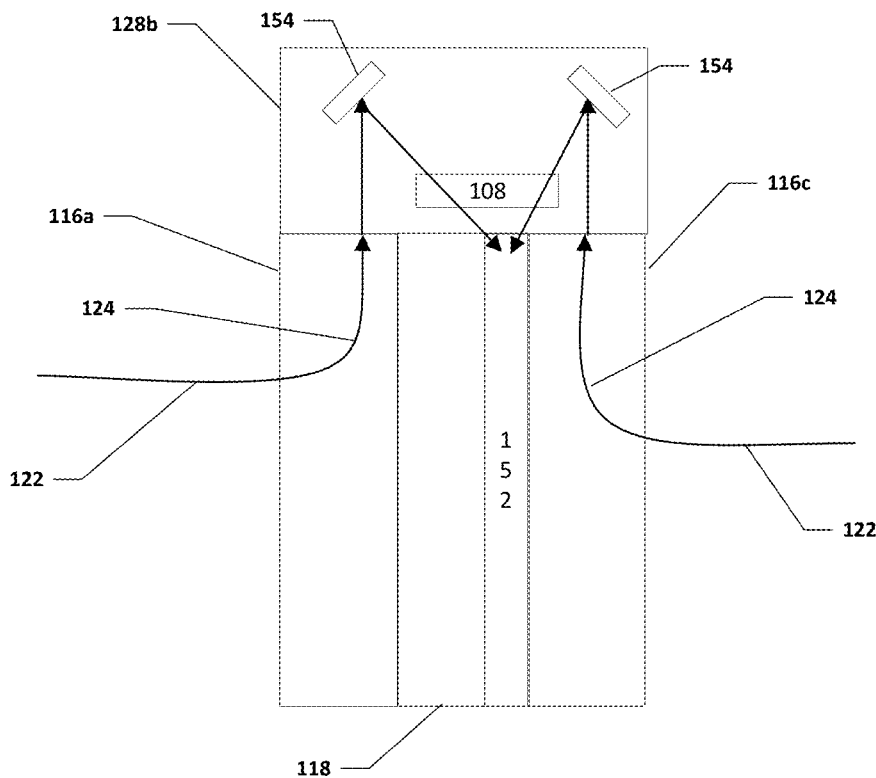
FIG. 7 is a simplified block diagram of a portion of a system to enable a display supplemented with ambient light, in accordance with an embodiment of the present disclosure.

Turning to FIG. 7, FIG. 7 is a simple block diagram top cutaway view illustrating incoming ambient light 122 entering front ambient light guiding layer 116a and back ambient light guiding layer 116c, becoming bent ambient light 124, and being used as a blacklight or to supplement the backlight. Bent ambient light 124 in front ambient light guiding layer 116a can be guided to the edges of front ambient light guiding layer 116a and to ambient light controllers. For example, as illustrated in FIG. 7, as ambient light 122 enters front ambient light guiding layer 116a, it becomes bent ambient light 124 and is guided towards ambient light controller 128b on the first side of ambient light guiding layer 116 (or as illustrated in FIG. 5B, towards ambient light controller 128c on the second side of ambient light guiding layer 116). Also, bent ambient light 124 in back ambient light guiding layer 116c can be directed to the edges of back ambient light guiding layer 116c and to ambient light controller 128. For example, as illustrated in FIG. 7 as ambient light 122 enters back ambient light guiding layer 116c, it becomes bent ambient light 124 and is guided towards ambient light controller 128b on the first side of back ambient light guiding layer 116c (or as illustrated in FIG. 5B, towards ambient light controller 128c on the second side of back ambient light guiding layer 116c).

Ambient light controller 128b can reflect bent ambient light 124 to display image layer 118 so the reflected bent ambient light 124 can be used to supplement the blacklight. For example, as illustrated in FIG. 7, bent ambient light 124 can be reflected by one or more reflectors 154 to backlight 152. One or more ambient light monitoring engines 108 can be configured monitor and/or measure the amount and/or intensity of bent ambient light 124 and communicate the amount and/or intensity of bent ambient light 124 to display engine 106 (not shown).

Figure 8:
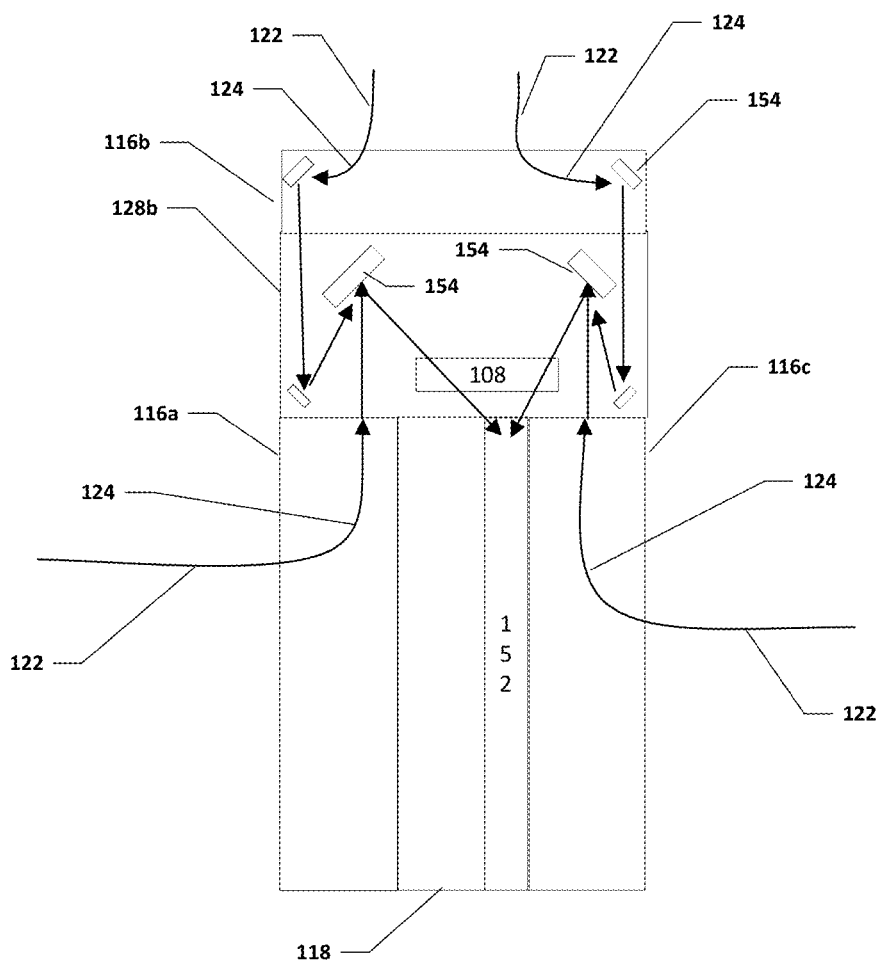
FIG. 8 is a simplified block diagram of a portion of a system to enable a display supplemented with ambient light, in accordance with an embodiment of the present disclosure.

Turning to FIG. 8, FIG. 8 is a simple block diagram top cutaway view illustrating incoming ambient light 122 entering front ambient light guiding layer 116a, side ambient light guiding layer 116b, and back ambient light guiding layer 116c, becoming bent ambient light 124, and being used as a blacklight or to supplement the backlight. Bent ambient light 124 in front ambient light guiding layer 116a can be guided to the edges of front ambient light guiding layer 116a and to ambient light controllers. For example, as illustrated in FIG. 8, as ambient light 122 enters front ambient light guiding layer 116a, it becomes bent ambient light 124 and is guided towards ambient light controller 128b on the first side of ambient light guiding layer 116 (or as illustrated in FIG. 6B, towards ambient light controller 128c on the second side of ambient light guiding layer 116). Also, bent ambient light 124 in side ambient light guiding layer 116b can be directed to the edges of side ambient light guiding layer 116b and to ambient light controller 128. For example, as illustrated in FIG. 8 as ambient light 122 enters side ambient light guiding layer 116b, it becomes bent ambient light 124 and is guided towards ambient light controller 128b on the first side of back ambient light guiding layer 116c (or as illustrated in FIG. 6B, towards ambient light controller 128c on the second side of back ambient light guiding layer 116c). In addition, bent ambient light 124 in back ambient light guiding layer 116c can be guided to the edges of back ambient light guiding layer 116c and to ambient light controller 128. For example, as illustrated in FIG. 8 as ambient light 122 enters back ambient light guiding layer 116c, it becomes bent ambient light 124 and is guided towards ambient light controller 128b on the first side of back ambient light guiding layer 116c (or as illustrated in FIG. 6B, towards ambient light controller 128c on the second side of back ambient light guiding layer 116c).

Ambient light controller 128b can reflect bent ambient light 124 to display image layer 118 so the reflected bent ambient light 124 can be used to supplement the blacklight.

For example, as illustrated in FIG. 8, bent ambient light 124 can be reflected by one or more reflectors 154 to backlight 152. One or more ambient light monitoring engines 108 can be configured monitor and/or measure the amount and/or intensity of bent ambient light 124 and communicate the amount and/or intensity of bent ambient light 124 to display engine 106 (not shown).

Figure 9:
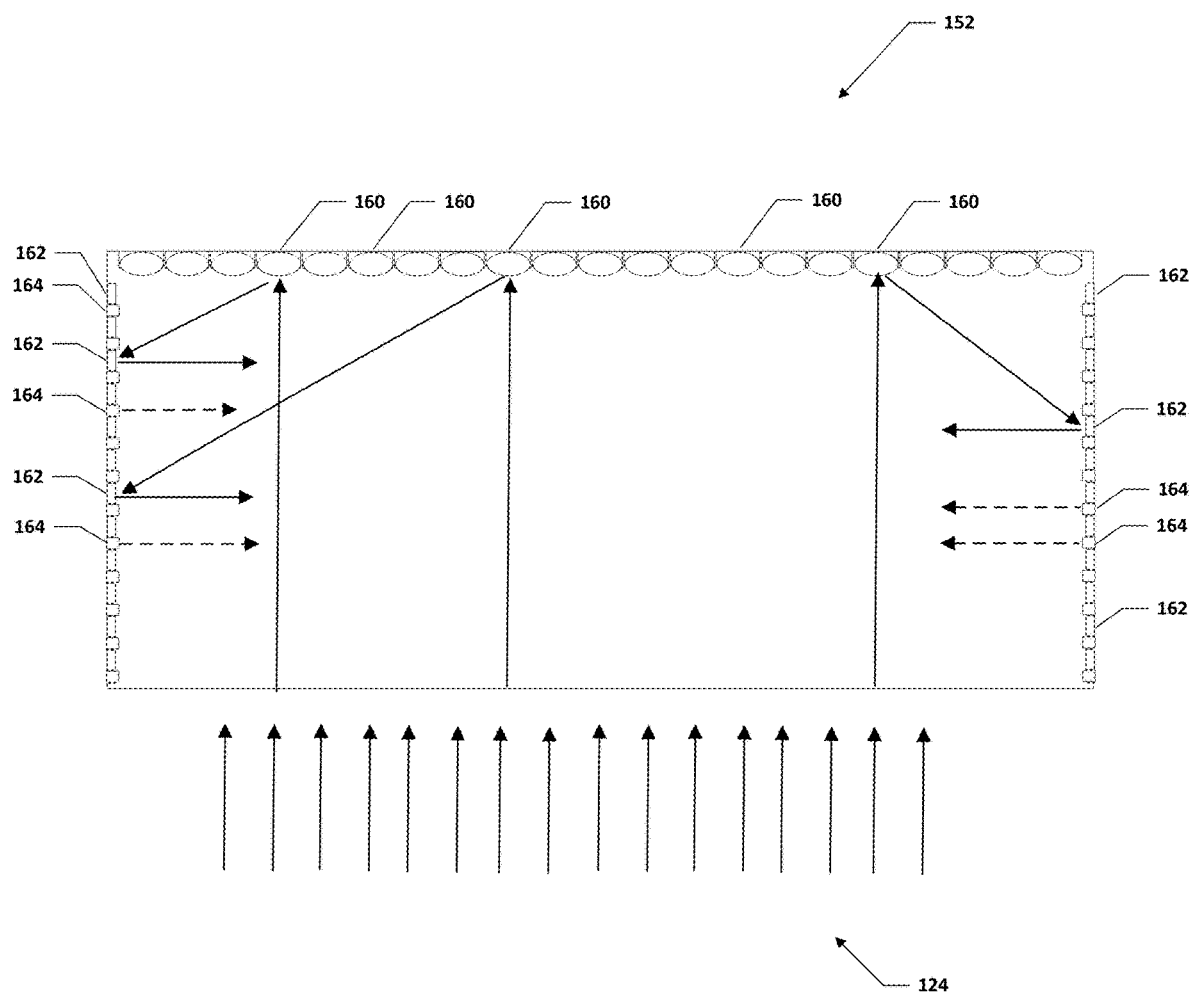
FIG. 9 is a simplified block diagram of a portion of a system to enable a display supplemented with ambient light, in accordance with an embodiment of the present disclosure.

Turning to FIG. 9, FIG. 9 is a simple block diagram view illustrating bent ambient light 124 being used to supplement the backlight. After bent ambient light 124 is reflected by one or more reflectors 154 to backlight 152 (as illustrated in FIG. 8), bent ambient light 124 enters backlight 152. Backlight 152 can include plurality of backlight reflectors 160, a plurality of reflecting surfaces 162, and a plurality of illumination sources 164.

When bent ambient light 124 enters backlight 152, it travels to one of backlight reflectors 160. Backlight reflectors 160 reflect bent ambient light 124 towards reflecting surfaces 162. Backlight reflectors 160 can be lenses or another type of reflector that can reflect bent ambient light 124 towards reflecting surfaces 162. In an example, backlight reflectors 160 are convex lens. In a specific example, backlight reflectors 160 are micro lens. Reflecting surfaces 162 reflect bent ambient light 124 from backlight reflectors 160 so it can be used to help allow an image to be shown on display 104 (illustrated in FIG. 1). Plurality of illumination sources 164 can be used when the intensity of bent ambient light 124 is not enough to help allow the image to be shown on display 104. In an example, each of plurality of illumination sources 164 may be backlight LEDs. In a specific example, each of plurality of illumination sources 164 may be backlight LEDs used in some current devices.

Backlight 152 can be configured to capture and concentrate bent ambient light 124 in the display housing using backlight reflectors 160 and reflecting surfaces 162. In an example, bent ambient light 124 can be captured and concentrated to a point by use of convex lenses. The concentrated beams of bent ambient light 124 are made to reflect off reflecting surfaces 162 to act as a substitute or complement the existing backlight. Reflecting surfaces 162 can be mirrors located in between illumination sources 164 and are used to reflect the concentrated beams of bent ambient light 124 into the lightguides as the LEDs would in some current backlights.

In an example, if the intensity of bent ambient light 124 is insufficient to illuminate one or more areas of display image layer 118, the illumination from bent ambient light 124 can be supplemented with the light from illumination sources 164. The light from illumination sources 164 can be adjusted based on the intensity of bent ambient light 124 so the illumination of display image layer 118 is uniform. For example, if the intensity of bent ambient light 124 is relatively low, then the intensity of illumination sources 164 would need to be relatively high in intensity, in contrast if the intensity of bent ambient light 124 is relatively high, then the intensity of illumination sources 164 can be relatively low. In an example, display engine 106 (not shown) can use data from ambient light monitoring engine 108 (not shown) to help determine the intensity of illumination sources 164 needed to display an image to the user. Power can be saved by supplementing the backlight used to display the image from display image layer 118 with bent ambient light 124 and allow the intensity of from illumination sources 164 (e.g., the system generated backlight) to be reduced. The reduction the intensity of illumination sources 164 can help conserve system power.

Figure 10:
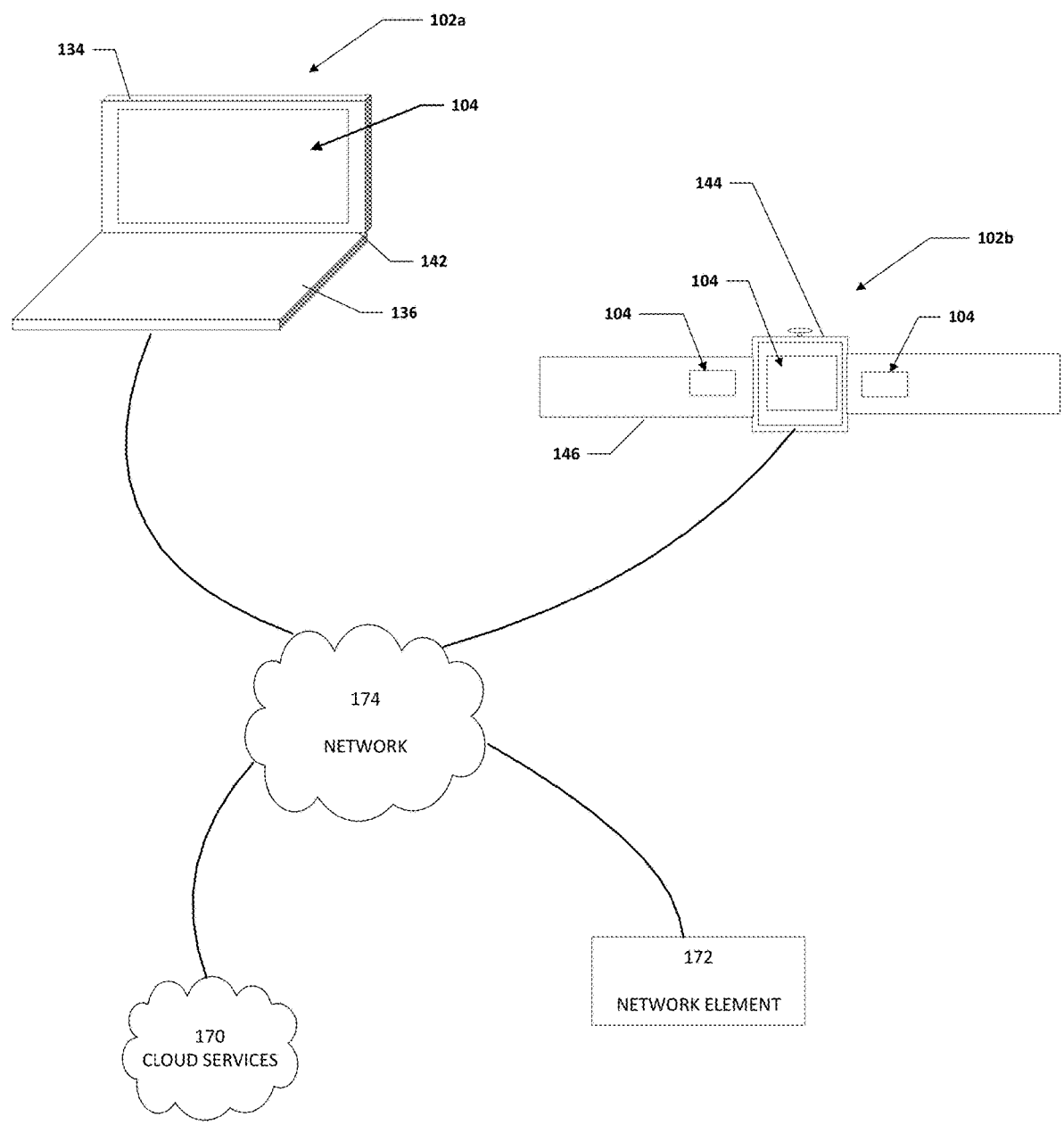
FIG. 10 is simplified block diagram of electronic devices that include a system to enable a display supplemented with ambient light, in accordance with an embodiment of the present disclosure.

Turning to FIG. 10, FIG. 10 is a simplified block diagram of electronic devices 102a and 102b configured to enable a display supplemented with ambient light, in accordance with an embodiment of the present disclosure. In an example, electronic device 102a can include first housing 134 and second housing 136. First housing 134 can be rotatably coupled to second housing 136 using hinge 142. First housing 134 can include at least display 104. In an example, electronic device 102a is a laptop computer and second housing 136 can include a keyboard. In an example, back ambient light guiding layer 116c may be on the back chassis or surface of electronic device 102a to capture ambient light (for example, as illustrated in FIG. 4). In some examples, first housing 134 can be rotated about three hundred and sixty degrees relative to second housing 136 using hinge 142. In some examples, second housing 136 can be detached from first housing 134 and first housing 134 may be a tablet or handheld electronic device. In an example, electronic device 102b can include a main body 144 and wrist straps 146. Main body 144 can include a display 104. Also, wrist straps 146 can include one or more displays 104.

Electronic devices 102a and 102b may each be a stand-alone device or in communication with cloud services 170 and/or one or more network elements 172 using network 174. Network 174 represents a series of points or nodes of interconnected communication paths for receiving and transmitting packets of information. Network 174 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In network 174, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks.

It is also important to note that the operations in the preceding diagrams illustrates only some of the possible scenarios and patterns that may be executed by, or within, electronic devices 102, 102a, and 102b. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by electronic devices 102, 102a, and 102b in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although electronic devices 102, 102a, and 102b have been illustrated with reference to particular elements and operations, these elements and operations may be replaced by any suitable architecture, protocols, and/or processes that achieve the intended functionality of electronic devices 102, 102a, and 102b.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

In Example A1, an electronic device can include a display, a backlight for the display, and one or more ambient light guiding layers to guide ambient light to the backlight and supplement the backlight with the ambient light.

In Example A2, the subject matter of Example A1 can optionally include where one of the one or more ambient light guiding layers is located on a back side of the electronic device, where the back side is opposite of a side of the electronic device that includes the display.

In Example A3, the subject matter of any one of Examples A1-A2 can optionally include where one of the one or more ambient light guiding layers is located on a side of the electronic device that is perpendicular to the side of the electronic device that includes the display.

In Example A4, the subject matter of any one of Examples A1-A3 can optionally include where one of the one or more ambient light guiding layers is located in front of the display.

In Example A5, the subject matter of any one of Examples A1-A4 can optionally include where the one or more ambient light guiding layers include lenses, light guides, and/or reflectors.

In Example A6, the subject matter of any one of Examples A1-A5 can optionally include an ambient light monitoring engine to monitor an intensity of ambient light.

In Example A7, the subject matter of any one of Examples A1-A6 can optionally include at least four ambient light monitoring engines, where each side of the display includes an ambient light monitoring engine.

In Example A8, the subject matter of any one of Examples A1-A7 can optionally include where the electronic device is a laptop computer.

Example M1 is a method including bending received ambient light to an edge of one or more ambient light guiding layers to supplement a backlight of a display of an electronic device with ambient light and allowing light from an image on the display to pass through a front ambient light guiding layer when the display is actively displaying the image.

In Example M2, the subject matter of Example M1 can optionally include where one of the one or more ambient light guiding layers is located on a back side of the electronic device, where the back side is opposite of a side of the electronic device that includes the display.

In Example M3, the subject matter of any one of the Examples M1-M2 can optionally include where one of the one or more ambient light guiding layers is located on a side of the electronic device that is perpendicular to the side of the electronic device that includes the display.

In Example M4, the subject matter of any one of the Examples M1-M3 can optionally include bending received ambient light to an edge of the front ambient light guiding layer when the display is not actively displaying the image.

In Example M5, the subject matter of any one of the Examples M1-M4 can optionally include where the display is not actively displaying the image during a vertical blanking interval.

In Example M6, the subject matter of any one of the Examples M1-M5 can optionally include monitoring an intensity of the ambient light using an ambient light monitoring engine.

In Example M7, the subject matter of any one of the Examples M1-M6 can optionally include where the electronic device is a laptop computer.

Example S1 is a system to supplement a backlight of a display with ambient light. The system can include memory, at least one processor, a display, a backlight for the display, one or more ambient light guiding layers to guide ambient light to the backlight and supplement the backlight with the ambient light, an ambient light monitoring engine, where the ambient light monitoring engine causes the at least one processor to monitor an intensity of ambient light, and a display engine, where the display engine uses data from the ambient light monitoring engine to cause the at least one processor to determine an intensity of the backlight for the display.

In Example S2, the subject matter of Example S1 can optionally include where one of the one or more ambient light guiding layers is located on a back side of an electronic device, where the back side is opposite of a side of the electronic device that includes the display.

In Example S3, the subject matter of any one of the Examples S1-S2 can optionally include where the one or more ambient light guiding layers include lenses, light guides, and/or reflectors.

In Example S4, the subject matter of any one of the Examples S1-S3 can optionally include at least four ambient light monitoring engines, where each side of the display includes an ambient light monitoring engine.

In Example S5, the subject matter of any one of the Examples S1-S4 can optionally include where the system is part of a laptop computer.

Example AA1 is an apparatus including means for bending received ambient light to an edge of one or more ambient light guiding layers to supplement a backlight of a display of an electronic device with ambient light and means for allowing light from an image on the display to pass through a front ambient light guiding layer when the display is actively displaying the image.

In Example AA2, the subject matter of Example AA1 can optionally include where one of the one or more ambient light guiding layers is located on a back side of the electronic device, where the back side is opposite of a side of the electronic device that includes the display.

In Example AA3, the subject matter of any one of Examples AA1-AA2 can optionally include where one of the one or more ambient light guiding layers is located on a side of the electronic device that is perpendicular to the side of the electronic device that includes the display.

In Example AA4, the subject matter of any one of Examples AA1-AA3 can optionally include means for bending received ambient light to an edge of the front ambient light guiding layer when the display is not actively displaying the image.

In Example AA5, the subject matter of any one of Examples AA1-AA4 can optionally include where the display is not actively displaying the image during a vertical blanking interval.

In Example AA6, the subject matter of any one of Examples AA1-AA5 can optionally include means for monitoring an intensity of the ambient light using an ambient light monitoring engine.

In Example AA7, the subject matter of any one of Examples AA1-AA6 can optionally include where the electronic device is a laptop computer.

Example X1 is a machine-readable storage medium including machine-readable instructions to implement a method or realize an apparatus as in any one of the Examples A1-A8, AA1-AA7, or M1-M7. Example Y1 is an apparatus comprising means for performing any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device comprising:
a display;
a backlight for the display; and
one or more ambient light guiding layers to guide ambient light to the backlight and supplement the backlight with the ambient light, wherein at least a portion of received ambient light is bent to an edge of one or more ambient light guiding layers to supplement the backlight with the ambient light.

2. The electronic device of claim 1, wherein one of the one or more ambient light guiding layers is located on a back side of the electronic device, wherein the back side is opposite of a side of the electronic device that includes the display.

3. The electronic device of claim 1, wherein one of the one or more ambient light guiding layers is located on a side of the electronic device that is perpendicular to the side of the electronic device that includes the display.

4. The electronic device of claim 1, wherein one of the one or more ambient light guiding layers is located in front of the display.

5. The electronic device of claim 1, wherein the one or more ambient light guiding layers include lenses, light guides, and/or reflectors.

6. The electronic device of claim 1, further comprising:
an ambient light monitoring engine to monitor an intensity of ambient light.

7. The electronic device of claim 1, further comprising:
at least four ambient light monitoring engines, wherein each side of the display includes an ambient light monitoring engine.

8. The electronic device of claim 1, wherein the electronic device is a laptop computer.

9. A method comprising:
bending received ambient light to an edge of one or more ambient light guiding layers to supplement a backlight of a display of an electronic device with ambient light; and
allowing light from an image on the display to pass through a front ambient light guiding layer when the display is actively displaying the image.

10. The method of claim 9, wherein one of the one or more ambient light guiding layers is located on a back side of the electronic device, wherein the back side is opposite of a side of the electronic device that includes the display.

11. The method of claim 9, wherein one of the one or more ambient light guiding layers is located on a side of the electronic device that is perpendicular to the side of the electronic device that includes the display.

12. The method of claim 9, further comprising:
bending received ambient light to an edge of the front ambient light guiding layer when the display is not actively displaying the image.

13. The method of claim 12, wherein the display is not actively displaying the image during a vertical blanking interval.

14. The method of claim 9, further comprising:
monitoring an intensity of the ambient light using an ambient light monitoring engine.

15. The method of claim 9, wherein the electronic device is a laptop computer.

16. A system to supplement a backlight of a display with ambient light, the system comprising:
memory;
at least one processor;
a display;
a backlight for the display;
one or more ambient light guiding layers to guide ambient light to the backlight and supplement the backlight with the ambient light, wherein at least a portion of received ambient light is bent to an edge of one or more ambient light guiding layers to supplement the backlight with the ambient light;
an ambient light monitoring engine, wherein the ambient light monitoring engine causes the at least one processor to monitor an intensity of ambient light; and
a display engine, wherein the display engine uses data from the ambient light monitoring engine to cause the at least one processor to determine an intensity of the backlight for the display.

17. The system of claim 16, wherein one of the one or more ambient light guiding layers is located on a back side of an electronic device, wherein the back side is opposite of a side of the electronic device that includes the display.

18. The system of claim 16, wherein the one or more ambient light guiding layers include lenses, light guides, and/or reflectors.

19. The system of claim 16, further comprising:
at least four ambient light monitoring engines, wherein each side of the display includes an ambient light monitoring engine.

20. The system of claim 16, wherein the system is part of a laptop computer.

* * * * *